(12) United States Patent
Caillaud et al.

(10) Patent No.: US 8,392,038 B2
(45) Date of Patent: Mar. 5, 2013

(54) METHOD OF CONSTRUCTING A VERTICAL PROFILE IN THE EVENT OF DEPRESSURIZATION IN AN AREA WITH RISKS AND ASSOCIATED DEVICES

(75) Inventors: Christophe Caillaud, Blagnac (FR); Jérôme Sacle, Toulouse (FR)

(73) Assignee: Thales, Neuilly sur Seine (FR)

( * ) Notice: Subject to any disclaimer, the term of this patent is extended or adjusted under 35 U.S.C. 154(b) by 464 days.

(21) Appl. No.: 12/635,421

(22) Filed: Dec. 10, 2009

(65) Prior Publication Data

US 2010/0168936 A1 Jul. 1, 2010

(30) Foreign Application Priority Data

Dec. 16, 2008 (FR) ..................................... 08 07059

(51) Int. Cl.
*B64D 11/00* (2006.01)
*G05D 1/04* (2006.01)
(52) U.S. Cl. .............. 701/5; 701/10; 701/18; 244/118.5
(58) Field of Classification Search .................. 701/5, 3, 701/10, 16, 18, 120, 528; 244/118.5
See application file for complete search history.

(56) References Cited

U.S. PATENT DOCUMENTS

| 6,134,500 | A  | * | 10/2000 | Tang et al. ..................... 701/528 |
| 2004/0094666 | A1 | * | 5/2004 | Rogitz ......................... 244/118.5 |
| 2007/0043482 | A1 |   | 2/2007 | Aimar |
| 2008/0300737 | A1 | * | 12/2008 | Sacle et al. ........................ 701/3 |

FOREIGN PATENT DOCUMENTS

| EP | 1953728 | 8/2008 |
| FR | 2906921 | 4/2008 |
| FR | 2916840 | 12/2008 |

* cited by examiner

*Primary Examiner* — Tan Q Nguyen
(74) *Attorney, Agent, or Firm* — LaRiviere, Grubman & Payne, LLP (57) ABSTRACT

The method of generating a secure flight plan portion in the event of depressurization corresponding to a time-conditioned descent profile that may include a succession of levels, comprises:
  a step of defining a first point of the flight plan, called non-return point, denoted NRP, and a second point of the flight plan, called EOZ, the two points delimiting a portion of the flight plan plotted above an area identified as "with risks";
  a step of defining two radials in the horizontal plane respectively passing through the first and the second points;
  a step of determining a first flight plan portion comprising the definition of a lateral offset angle from the original flight plan;
  a step of determining a vertical descent profile;
  a step of displaying time markers indicating the exhaustion of the oxygen reserve.

17 Claims, 4 Drawing Sheets

| | |
|---|---|
| NRP | BRAVO |
| NRP RADIAL | 350° |
| OFFSET ANGLE | 45° |
| OFFSET DIST | 5R |
| ALT STEP | FL160 |
| T1 | 12 min |
| $M_{CREW}$ | 16 min |
| $M_{PAX}$ | 15 min |
| EOZ | DELTA |
| EOZ RADIAL | 007° |

METHOD OF CONSTRUCTING A VERTICAL PROFILE IN THE EVENT OF DEPRESSURIZATION IN AN AREA WITH RISKS AND ASSOCIATED DEVICES

PRIORITY CLAIM

This application claims priority to French Patent Application Number 08 07059, entitled Method Of Constructing A Vertical Profile In The Event Of Depressurization In An Area With Risks And Associated Devices, filed Dec. 16, 2008.

TECHNICAL FIELD

The present invention relates to the field of flight management devices for aircraft, notably in emergency manoeuvres. More particularly, the invention relates to the emergency procedures in the event of a depressurization of an aircraft and its flight context. Finally, the invention relates to the generation of depressurization descent profiles suited to the relief being flown over.

BACKGROUND OF THE INVENTION

The increasing proportion of automation over the last 30 years in avionics, both civilian and military, has led to the increasing use by the crews of electronic systems, and less and less direct influence on the primary piloting controls of the aircraft.

This trend has been accentuated over the last twenty years with the generalization of onboard flight management systems, commonly referred to as FMS.

A flight management system consists of various functional components that enable the crew to program a flight from a navigation database. The system then calculates a lateral and vertical trajectory making it possible to reach the destination of the flight plan based on the characteristics of the aeroplane and the data supplied by the crew, and the environment of the system. The positioning and guidance functions collaborate to help the aircraft remain on this trajectory.

The interface functions with the crew and with the ground are used to place man in the navigation loop, because only he can be responsible for the progress of the flight.

When the operator needs to perform an emergency manoeuvre, such as in the event of a depressurization, he must follow a documented procedure that begins in accordance with the regulations with separation from the route that is assigned to him with an angle, generally of 45°, then descent to the altitude of 10 000 feet so that people, notably the crew, the commercial personnel and the passengers onboard the aircraft can breathe normally.

It often happens that the aircraft can continue to its destination at this altitude while following a route parallel to the one that was assigned to it.

This manoeuvre is complicated when the aircraft is flying over mountainous regions, preventing it from descending directly to the altitude of 10 000 feet.

An airline company flying over these types of area must therefore prepare particular procedures, called "escape routes", making it possible to reach the correct altitude, while avoiding the relief, and before the oxygen generator has exhausted its resources.

The company Northwest Airlines has, for example, developed a procedure of this type for its fleet of Airbus A330 flying over Greenland, Iran and Afghanistan.

A number of functions to assist in the management of a pressurization failure are known, mainly based on a knowledge of the surrounding terrain or on taking automatic control of the aircraft by a system. In case of depressurization, the crew may have difficulties in analyzing the information displayed on the screens in manual piloting mode, considering the short space of time in which it must act.

Given the context of sequencing manoeuvres while continuing to navigate, the use of a flight management system, such as the FMS, is appropriate to lighten the workload of the crew and its stress in this oppressive situation.

Currently, the operator has a number of tools, such as, for example, the OFFSET function. The latter makes it possible to deviate from the assigned route by programming a modifiable capture angle, then following a parallel route. The FMS is capable of managing a trajectory parallel to the flight plane with modifiable capture angle. In emergency cases, a modifiable capture angle may be 45° for example.

One problem is that the FMS does not these days manage a flight plan portion comprising a descent profile taking into account relief variations or obstacles and does not adapt the descent according to the outside environment.

The FMS can manage scheduled changes of altitude, but based on geographic positions or on optimization criteria. The operator can then calculate the position at which the aeroplane is located at a given instant and insert a change of level from that point.

However, this operation is unrealistic in a stress situation, for example in the event of a depressurization. Weather events may mean that the point initially calculated is reached later than planned, which means that the crew has to completely manage this procedure according to the time that has passed since the problem of depressurization of the aircraft was detected.

To manage the depressurization of an aircraft, the operator currently has only a written procedure and his knowledge of the aeroplane system.

The invention makes it possible to overcome the above-mentioned drawbacks.

SUMMARY OF THE INVENTION

The invention proposes a method of generating a flight plan corresponding to a depressurization descent profile taking into account the presence of areas with identified risks, the topology of which presents a risk in an emergency descent.

The invention therefore makes it possible to prepare and modify a flight plan portion comprising a descent comprising a number of configurable levels. Furthermore, the crew can impose a time constraint for generating a descent profile enabling the aircraft to descend to an altitude where additional oxygen is no longer needed before the reserves are exhausted.

The invention also comprises a device comprising interfaces for the crew making it possible to configure the flight plan portion generated and a display making it possible to view the generated portion and markers indicating the end of the oxygen reserves.

Advantageously, the method of generating a secure flight plan portion in the event of depressurization corresponding to a depressurization descent profile in the presence of obstacles, an original flight plan being defined, comprises:
  a step of defining a first point of the flight plan, called non-return point, denoted NRP, and a second point of the flight plan, called EOZ, the two points delimiting a portion of the flight plan plotted above an area identified as "with risks";

a step of determining a first flight plan portion comprising the definition of a lateral offset angle from the original flight plan and the definition of a distance to be traveled on said offset branch;

a step of determining a vertical descent profile comprising the vertical part of the first flight plan portion and the vertical part of a second flight plan portion, a set of safety altitudes defining a set of levels and of waypoints for the aircraft on the two flight plan portions, the last level allowing the crew and the passengers to breathe freely without the need for additional oxygen.

Advantageously, the method of generating a secure flight plan portion in the event of depressurization corresponding to a depressurization descent profile according to claim 1, comprises:

a step of defining two radials in the horizontal plane respectively passing through the first and the second points and each forming a determined angle with the route formed by the flight plan, the area situated between the two radials forming an area of obstacles in which a depressurization descent profile is adopted from means of activation by the crew of the aircraft when the aircraft is in this area.

Advantageously, the step of determining a descent profile comprises the definition of a first intermediate level and a last level making it possible for the crew and the passengers to breathe freely without the need for additional oxygen.

Advantageously, the step of determining a descent profile comprises the definition:

of a first duration T1 corresponding to the period between the start of the offset of the aircraft and the start of the descent to the last level;

of an altitude of an intermediate level, the aircraft performing, during the first duration, a descent to the intermediate level and a flight at said altitude.

Advantageously, the lateral part of the second flight plan portion is generated from copying the lateral part of the original flight plan, the aircraft flying the second portion on completion of the first portion.

Advantageously, a depressurization descent profile is preconfigured, the lateral offset start point being the point NRP.

Advantageously, a preconfigured depressurization descent profile can be modified by the crew of the aircraft.

Advantageously, a step of verifying the presence of the aircraft between the two radials defining the area makes it possible to preactivate and activate the depressurization descent.

Advantageously, the step of determining a descent profile comprises the definition:

of a first time marker corresponding to a first predicted position of the aircraft on the descent profile, the first position corresponding to the stopping of the provision of oxygen for the passengers;

of a second time marker corresponding to a second predicted position of the aircraft on the descent profile, the second position corresponding to the stopping of provision of oxygen for the crew.

Advantageously, a step of displaying the first and the second markers from viewing means comprises the display of the markers on the portion of the flight plan corresponding to a depressurization descent profile and the display of the predictions of the altitudes and of the times of passage at said points.

Advantageously, the last level is situated at an altitude of 10 000 feet.

Advantageously, the time needed to travel the distance already traveled from the point NRP to the pressurization failure point is automatically deducted from the initial duration needed to travel the intermediate level.

Advantageously, the automatic pilot pilots the aeroplane controls automatically when the activation by the crew of the depressurization descent profile is engaged.

Advantageously, the device for securing a flight for aircraft implementing the method according to the invention comprises:

a flight computer capable of generating a depressurization descent profile;

an interface for managing the parameters of the depressurization descent profile.

Advantageously, the interface for managing the parameters of the depressurization descent profile can be used to configure:

a first duration T1 corresponding to the time elapsed between the moment of lateral offset and the moment of the start of the descent to the last level;

the lateral offset angle from the original flight plan;

a distance to be traveled on said offset branch;

the altitude of the intermediate level, corresponding to a minimum altitude above the relief;

the points NRP and EOZ.

Advantageously, the interface for managing the parameters of the depressurization descent profile can be used to configure lateral inclination angles of the radials passing through each of said points.

Advantageously, the interface for managing the parameters of the depressurization descent profile can be used to manually or automatically configure a descent profile comprising a number of descent segments before reaching a last level, the profile comprising, by means of the flight computer, the calculation of:

the flight duration of the first portion, the vertical profile during the first portion, and the position of the point of arrival at the intermediate altitude;

the flight duration of the intermediate level and the position of the start point of the descent to the last level;

the vertical profile and the flight duration of the descent to a last level of altitude corresponding to the reference altitude at which the aircraft is stabilized on completion of the depressurization descent procedure;

the position of the first waypoint at the last level.

Advantageously, the device for securing a flight for aircraft comprises:

a pressurization manager CPCS comprising means of detecting the loss of pressure in the cockpit;

an oxygen generator comprising interfaces with the FMS;

an interface for managing the parameters of the depressurization descent profile;

means of displaying the flight plan and the aircraft.

Advantageously, the viewing means display:

the original flight plan;

the flight plan comprising the lateral offset and the vertical descent profile comprising the two generated portions and;

two markers on said portions indicating at which instants the oxygen reserves for the passengers and for the crew will be exhausted.

BRIEF DESCRIPTION OF THE DRAWINGS

Other features and benefits of the invention will become apparent from the following description, given in light of the appended drawings that represent.

DETAILED DESCRIPTION OF THE INVENTION

In the event of depressurization, the invention makes it possible to generate a depressurization descent profile making it possible to descend in a number of descent segments to the altitude of 10 000 feet before the oxygen reserves are exhausted while retaining a safety margin above the relief.

The flight to an altitude substantially close to 10 000 feet then enables the crew and the passengers to breathe without the provision of additional oxygen originating from the reserves.

Generally in an aircraft, the pressure detection system is used to detect any disturbance in the pressure inside the aircraft or a depressurization that might occur following a failure or an incident. The air conditioning/pressurization system is used to maintain a quantity of oxygen within the aircraft for a determined duration. In the event of a failure or an accident causing a depressurization of the craft, an oxygen reserve of the conditioning system is used to maintain an oxygen level for a limited duration. On detection of the failure, the crew must then rapidly reach an altitude that makes it possible to overcome the lack of oxygen so that the crew and passengers can then continue to breathe.

In the latter case, the aircraft flies at the latter altitude until it begins a landing procedure.

In other embodiments, the standard altitude to be reached may be below 10 000 feet or slightly above depending on the standards or regulations that apply.

Figure 1:
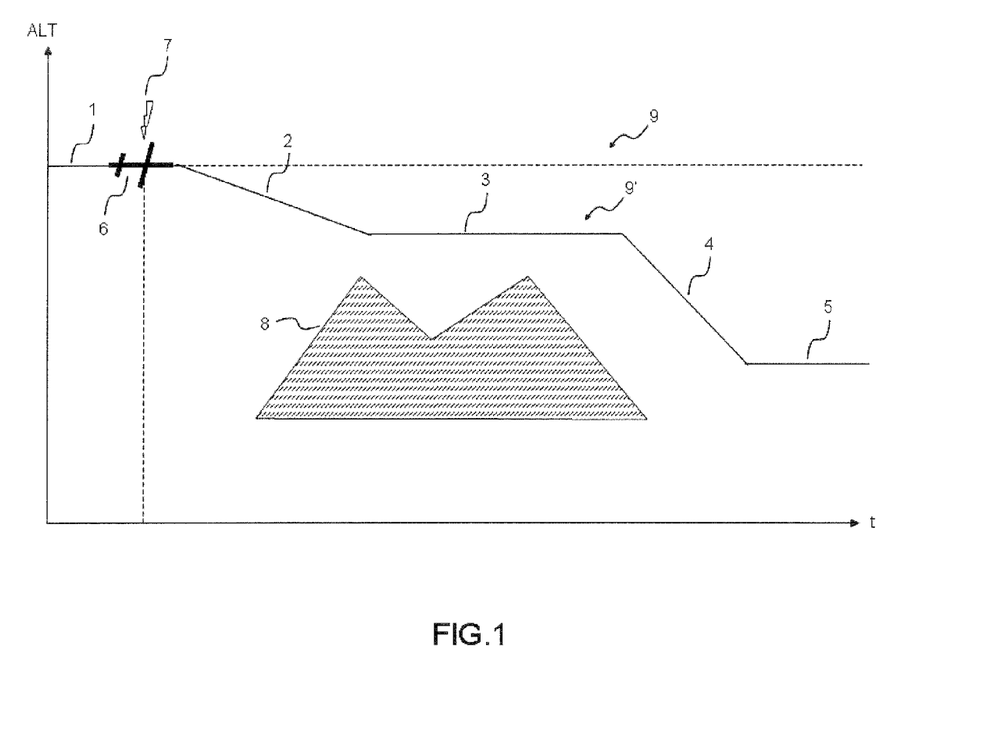
FIG. 1: a vertical cross section of a depressurization descent profile according to the invention comprising two levels.

FIG. 1 represents a depressurization descent profile 9' that takes account of an area of obstacles 8 such as mountains. An aircraft 6 suffers a failure or an accident 7 at a given instant causing a depressurization of the cockpit for example. The vertical trajectory of the flight plan 9, originally followed by the aircraft 6, must then be left so that the latter can reach an altitude 5 at which breathing inside the aircraft is possible without specific oxygen provision.

At the moment when the pressurization failure occurs, the aircraft is on a portion 1 of the flight plan situated at a cruising altitude.

It then follows a new flight plan portion 9', generated according to the inventive method, also called depressurization descent.

In this case, in the presence of mountains, the aircraft 6 can then, after having carried out a certain number of intermediate levels, reach the level 5, typically close to 10 000 feet. At the altitude of the latter level, the provision of oxygen by the oxygen generator, denoted EOS, is no longer necessary for the crew and passengers to be able to breathe.

The invention makes it possible to generate a descent profile comprising an intermediate level 3 reached after a first descent phase 2. The aircraft then flies over an area 8 of obstacles defined by a minimum altitude not to be crossed. This altitude is set before the flight during the configuration of the flight plan and the definition of the areas with risks, but can be modified during the flight by the crew.

When it follows the portion 9', the aircraft begins a depressurization descent by setting a constraint for the time of arrival at the last level. This time constraint can be configured according to a number of parameters, notably the level of the oxygen reserve, the number of levels, the vertical speed, the topology of the relief, etc.

When the portion 9' of the depressurization flight plan includes a single intermediate level 3, the aircraft remains at this altitude corresponding to the intermediate level before restarting a second descent phase 4 in order to reach the last level 5 where the provision of oxygen is no longer necessary, for example 10 000 feet. In aeronautical terminology, it is usual to denote the altitudes FL100, designating the altitude of 10 000 feet, or FL350 for the cruising altitude of 35 000 feet.

This descent profile is defined by altitude levels, typically two levels in a preferred embodiment. The first altitude level 3 makes it possible to remain above the relief and the second 5 corresponds to the altitude at which the generation of oxygen is no longer necessary.

The vertical trajectory of the aircraft of FIG. 1 is represented in a system of coordinates indicating the altitude ALT on the vertical scale and the time t in a horizontal scale.

Since the flight parameters such as speed can be programmed in advance by the FMS, it is possible to simply convert a distance setpoint into a time setpoint.

The transition from the cruising altitude 1, before the failure, to the altitude of the last level 5, can be performed according to a time condition.

Thus, the reserve of oxygen can function during a determined period, it is possible to configure the depressurization descent including an intermediate level by imposing a time constraint less than the oxygen reserve discharge time. The invention makes it possible notably to adjust the duration of the intermediate level to the time constraint.

Furthermore, the invention makes it possible on the one hand to predict a depressurization descent profile at a given point of the flight plan and on the other hand makes it possible to adjust the depressurization descent profile actually being flown to operational conditions according to the point where the failure occurs.

The prediction makes it possible to schedule and dimension the worst cases that can occur in the progress of the flight in the event of a failure.

The activation of the manoeuvre, depending on the conditions in which the incident occurs, is assisted by the knowledge of a predetermined descent profile taking into account obstacles or a relief of high altitudes.

When the descent manoeuvre is simply predicted, the time condition is then relative, it is measured by a duration regardless of the point of engagement of the depressurization descent. On the other hand, when the descent manoeuvre is activated and it is engaged by a pilot, the time condition is measured relative to a time reference, for example the moment of the occurrence of the depressurization or even the point of lateral offset used to depart from the flight plan when a lateral offset is engaged.

Figure 2:
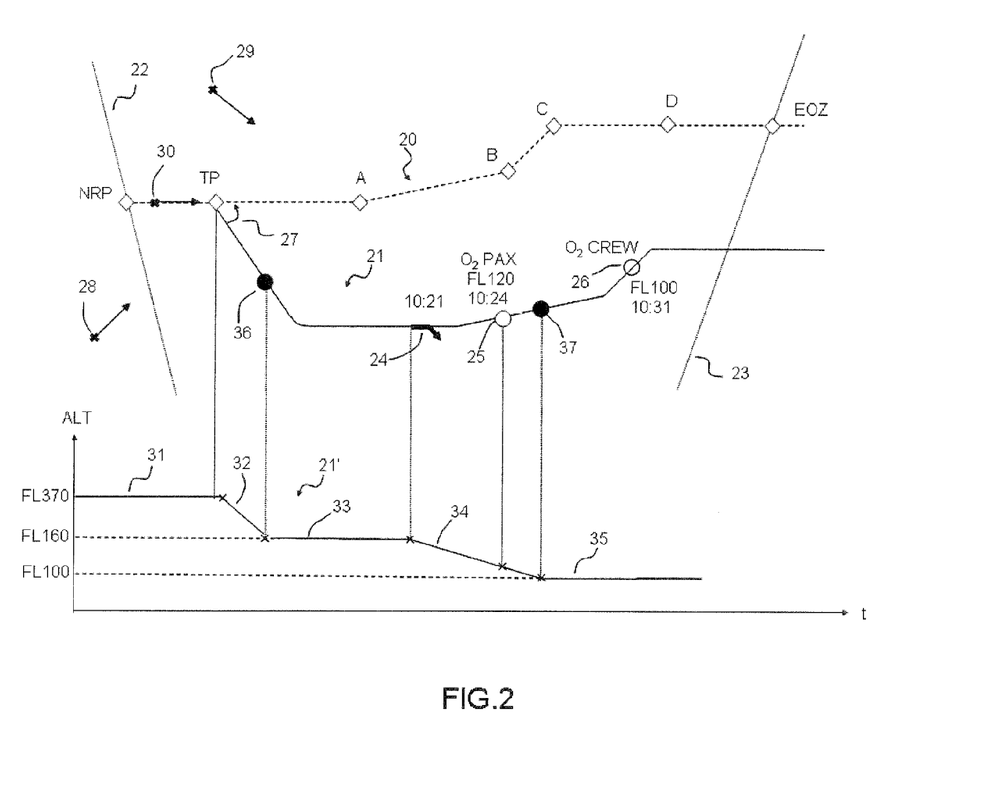
FIG. 2: a horizontal cross section of descent flight profile comprising an initial lateral offset.

FIG. 2 represents a portion 20 of the lateral part of the flight plan in a dotted line and the lateral trajectory 21' followed by the aircraft when pressurization failure occurs in a solid line. Moreover, FIG. 2 represents the portion 21' of the vertical part corresponding to the trajectory followed by the aircraft in the event of pressurization failure.

A portion 20 of the flight plan programmed in the FMS, notably comprising the waypoints NRP, TP, A, B, C, D, EOZ, is represented in FIG. 2. A point of the flight plan is called a "waypoint".

The point NRP, also called "non-return point", is determined as a point beyond which it is envisaged, in the event of failure, that the aircraft should continue in the same direction rather than begin a half-turn towards the closest airport.

The point NRP is determined according to the presence of obstacles, the topology of the relief, surrounding airports and other navigation parameters. The point NRP is determined before a flight for each flight plan affected by such relief surroundings for which the aeroplane performance characteristics are limiting.

It determines the strategy to be adopted when a pressurization failure occurs when flying over a region with risks according to whether the aircraft is downstream of upstream of the point NRP.

The point EOZ indicates that the portion of the flight plan overflying a hazardous area is ended. The acronym stands for "end of zone".

Thus, before a flight, the crew that programs the flight plan can indicate portions of the flight plan where the descent strategy according to the invention in the event of depressurization will take account of the relief.

Each area can be defined by a non-return point NRP and a point EOZ ending the portion.

Generally, the crew has available information regarding the topology of the terrain being flown over and can even be informed of the presence of certain areas with risks being flown over.

By programming this type of profile, the crew has available a tool that makes it possible to evaluate a depressurization scenario after the point NRP. The invention notably makes it possible to simulate a pressurization failure event and calculate a depressurization descent profile. In the latter case, the failure occurring in the worst conditions occurs at the point NRP where the aircraft can no longer make a half-turn and is obliged to adopt a depressurization descent profile above an area of relief. A priori, the latter case is the worst case given that the area to be flown over is the longest in order to get beyond the obstacles. In the latter case, it is the longest portion of relief that has to be considered to require the adoption of a particular descent profile.

If a pressurization failure occurs between the point NRP and the point EOZ, then a planned depressurization descent profile can be adopted or can be adjusted by modifying parameters of the profile via a dedicated interface.

As long as the point NRP identified in the flight plan is not sequenced, that is to say, it has not been crossed, the predictions concerning the portion containing the depressurization profile assume a failure at the NRP.

On the other hand, when it is sequenced, the predictions assume that the failure is immediate.

When a pressurization failure occurs, the aircraft performs a lateral OFFSET with a determined capture angle 27. In other words, it deviates from its flight plan trajectory with a lateral angle, for example of 45°, to be able to undertake a descent in a space without taking a risk in the descent regarding air lanes located below its own.

One embodiment of the invention makes it possible to begin a descent to a first level while deviating. The turn and the first descent 32 are performed immediately as the crew is informed of the pressurization failure occurring at the point TP in the example of FIG. 2. For example, if the aircraft is at cruising altitude, at the altitude FL370, on a level 31, following the detection of the failure, it goes to a first level 33 situated at FL160.

Depending on the programming of the FMS, when the pilot undertakes the new depressurization descent portion 21, he can configure the altitude of the first level 33 either by choosing the preconfigured default altitude or by modifying this altitude to that of his choice.

The point 36 corresponding to the first waypoint at the first level is reached according to the flight parameters of the aircraft in descent according to its speed and its vertical speed and the aeroplane configuration.

On the other hand, the pilot can determine the instant at which he wants the aircraft to reach the last level 35. This level 35 is decisive since it enables the crew and the passengers to breathe without the provision of additional oxygen.

Depending on the embodiment, the pilot can:
either configure the instant at which the aircraft must begin its descent to the last level 35, corresponding to the marker 24 in FIG. 2;
or configure the instant at which the aircraft must arrive at the last level 35, corresponding to the marker 37 in FIG. 2.

The FMS will in all cases adjust the duration of the level 33 or the vertical speed in the descent phase 34 until the first point of the last level 35 is reached, this point being displayed using a marker 37. The marker 37 is a reference for the crew indicating that the oxygen reserve is no longer necessary from this point until landing.

The invention makes it possible to display a marker 24 on the plot of the trajectory followed by the aircraft in the depressurization descent portion 21. The marker 24 indicates the moment at which the aircraft will begin its descent to the last level 35 and the time at which the descent will begin.

Moreover, the invention makes it possible to display the oxygen markers used by the crew to evaluate the remaining reserves and, if necessary, adjust the speed or the descent profile in order to reach the regulatory altitudes corresponding to the minimum quantity of oxygen for the crew and the passengers.

Advantageously, the flight computer, such as the FMS, positions one or more time markers indicating the point or points where the provision of oxygen will stop functioning for the pilots and potentially for the passengers. The oxygen generating sources are generally different according to the cockpit and the interior of the passenger compartment. The reference of the level of the oxygen reserve is generally measured for a determined flight duration, and markers can be positioned on the descent profile 21 in order to inform the pilot thereof.

FIG. 2 represents a first marker 25 indicating that the oxygen reserve for the passengers $O_2$ PAX will be exhausted at 10h24 at the altitude FL120. It also indicates by means of a second marker 26 that the crew will no longer be fed by the oxygen reserve $O_2$ CREW at 10h31 at the altitude FL100.

These markers make it possible to act on the parameters of the flight plan portion defining the depressurization descent. In the example of FIG. 2, it is problematic for the passengers no longer to be fed with oxygen while the level FL100 has not yet been reached.

The crew can then act via a flight plan management interface on the moment 24 of the start of descent to the last level 35 by modifying the value of the time to reach this point. The flight on the level 33 is all the shorter as it is necessary for the marker 25 to appear in the area of the level 35.

In a preferred embodiment, the depressurization descent portion is preprogrammed to satisfy the worst conditions, that is to say, the prediction of a failure at the point NRP. In this case, if a failure occurs after the point NRP, the crew will not theoretically have to modify the duration of the level, because the hazardous area to be flown over will be less extensive. On the other hand, to ensure a rapid descent to an altitude at FL100 to minimize the risks, the invention proposes, in a variant embodiment, adapting the distance already traveled from the point NRP to the point of pressurization failure by automatically reducing the duration of the level 33. To do this, an automatic countdown of the time is performed from passing the point NRP and is reported in the interface for managing the portion of the flight plan to be programmed described in FIG. 3.

The invention therefore makes it possible, in flight plan portions situated above areas of high relief, to define a point NRP and a point EOZ to mark the start and end of this area.

The emergency descent manoeuvre when an aircraft is flying over a mountainous area is based on a planned sequence of programmed altitude changes and on a lateral offset manoeuvre that has to be performed within a highly constrained time.

The invention makes it possible to use the flight management system to actuate the descent on a time activation criteria.

The activation of the manoeuvre causes the following actions to be sequenced:
- a copy of the flight plan to the destination;
- an immediate lateral offset comprising a configurable separation course, positioned at a 45° capture angle by default;
- a first descent comprising at least one intermediate level of an altitude making it possible to fly over the surrounding relief, the descent being defined by a point of engagement of the descent and a descent duration as well as a duration of flight at said level;
- a final descent to an altitude substantially close to 10 000 feet or an altitude at which the crew and passengers can breathe and the flight can be maintained to the destination at this level;

Moreover, the activation of the depressurization descent manoeuvre can, in a preferred embodiment, comprise the generation of the display on the viewing means of the cockpit of markers indicating the relative times corresponding to the end of availability of the oxygen reserve.

The sensitive area is determined between the points NRP and EOZ of the flight plan. The invention makes it possible to generate two horizontal straight lines 22, 23 intercepting the flight plan at the points NRP and EOZ making it possible to define an area in which the aircraft 30 must undertake the depressurization descent procedure according to the invention when a pressurization failure occurs. Such a straight line is called "a radial".

The radial proposed by default to define the sector is the perpendicular to the flight plan depending on the route for arrival at these points. The pilot can modify this orientation.

FIG. 2 represents radials that are slightly inclined to the normal of each of the routes downstream of the point intercepting the radial. The first radial is defined relative to an orientation with the portion of the flight plan between the point NRP and the waypoint TP and by its passage through the point NRP. The second radial is defined relative to its orientation with the route downstream of the point EOZ and by its passage through the point EOZ.

One benefit of the use of the radials is, if the aircraft is in a position that is offset, such as the positions 29 or 28, from the flight plan following a prior manoeuvre, then its position relative to the area with risks, situated between the two radials, can be simply compared to the position of one of the two radials.

The offset angle is by default 45°. The offset distance is the new distance from the parallel route to the flight plan to the right or to the left. The first descent is defined by a setpoint altitude of the intermediate level, expressed for example by FL160 to designate the level at 16 000 feet, and a point 24 of the start of descent as well as the time of the descent to arrive at the level.

In one embodiment, it is possible to define a zero offset, that is to say a lateral offset of 0°, and the aeroplane will begin its descent under the initial flight plan but with the same lateral route.

It is possible to define in a complete flight plan a number of areas with risks above which, in the event of a pressurization failure, a descent profile comprising a number of levels must be undertaken.

The invention makes it possible to activate the depressurization descent manoeuvre and the manoeuvre then becomes active.

The time markers pass in absolute time, that is to say that they display the time at which the manoeuvre has been undertaken incremented by the latency programmed to arrive at the point in question. The flight management system then guides the aircraft on its lateral trajectory, for example by following a heading of 45° towards a lateral offset.

A descent mode is engaged with the automatic pilot to reach the altitude specified previously by the crew.

This first altitude is maintained until the time defined for the descent to the last level, typically at the altitude towards 10 000 feet.

Figure 3:
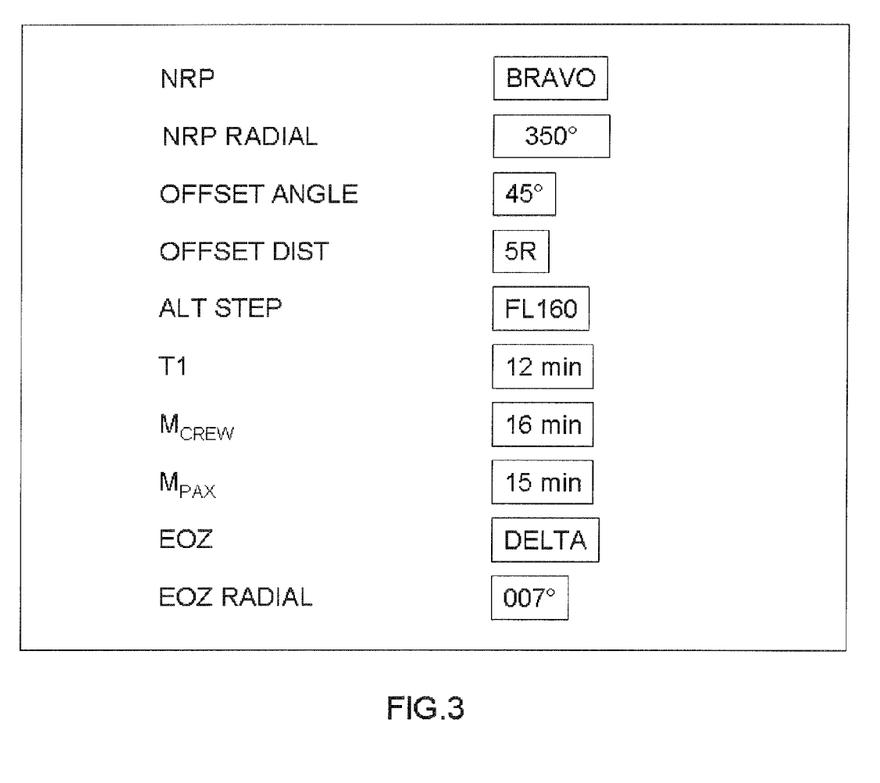
FIG. 3: an example of an interface for defining a descent profile in the event of depressurization.

FIG. 3 represents an example of a precompleted configuration interface for a depressurization descent profile when flying over a dangerous area. If a depressurization incident occurs, the crew can undertake a depressurization descent manoeuvre comprising a number of levels that can be configured from the interface.

Advantageously, the input fields can be prefilled with default values as defined in the example of FIG. 3. Typically, the default values can correspond to a case of failure at the point NRP.

Upon detection of a pressurization failure, the crew can then possibly modify the default values, and can then authorize the change of altitude and all the manoeuvre will be taken into account by the system.

Among the descent profile configuration parameters, the invention makes it possible to program:
- the name of the first waypoint selected as the point NRP, corresponding to the entry into the area with risks;
- the orientation of the first radial passing through the point NRP, denoted NRP RADIAL;
- the immediate angle of deviation after observing the pressurization failure, denoted OFFSET ANGLE;
- the lateral separation distance from the flight plan, denoted OFFSET DIST; the latter can be measured by the distance between a branch of the original flight plan and the current position of the aircraft;
- the altitude of the first level, called intermediate level, denoted ALT STEP;
- the time, denoted T1, between the of the start of the manoeuvre, corresponding to the start of the deviation, and the moment of the start of the descent to the final level, typically corresponding to an altitude of 10 000 feet.
- the time, denoted $M_{CREW}$, between the moment of the start of the manoeuvre and the moment when the oxygen reserve will be exhausted for the crew;
- the time, denoted $M_{PAX}$, between the moment of the start of the manoeuvre and the moment when the oxygen reserve will be exhausted for the passengers;
- the waypoint corresponding to the point EOZ, that is to say, the point indicating the end of the area with risks;

the orientation of the radial passing through the point EOZ ending the area.

Depending on the embodiments, the configuration interface can make it possible to program a number of intermediate levels according to the flight plans and the areas with risks that are identified.

The invention comprises a phase for preparation of the portion of the flight plan comprising an area with risks in the event of pressurization failure. The initialization of the preparation phase is performed according to a generic configuration menu or manual entries depending on the route. Whatever its initialization, at the flight preparation stage, the pilot checks the consistency with the line documents, specifically for the safety altitudes with respect to the intermediate level and the onboard oxygen quantity values. This route portion is dedicated to a given geographic area.

The invention makes it possible, from the detection of a loss of pressure, to propose a rapid activation of a depressurization descent.

The detection of the loss of pressure in the cockpit allows for a preactivation of a depressurization descent profile by generation of a temporary flight plan. The activation can then be carried out by means of an interface of the FMS by confirming the flight plan and/or by selecting the altitude of the intermediate level.

The invention also makes it possible at any time to cancel the manoeuvre from an interface of the FMS. In the latter case, the offset flight plan is cancelled accordingly and the original flight plan remains active.

When the depressurization descent is undertaken, the altitude constraint taken into account by the FMS is that of the first level, also called intermediate level when the descent profile comprises only two levels. In the example of an intermediate level situated at FL160, the aircraft first descends to FL160 as far as the end of level time marker, then to FL100. If the altitude of the last level is greater than FL100, this level will be carried out at the selected altitude.

The altitudes of the levels defined for the descent profile can be likened to altitude and waypoint passage constraints.

When the aircraft is outside the flight plan, the offset will not be activated on undertaking the function. The aircraft continues and descends on the same flight plan considering the flight to be outside of an air route; typically this case can correspond to the position 29 of the aircraft of FIG. 2.

Depending on the effect of the depressurization on the integrity of the aircraft, the pilot can, during the descent, reduce the speed, or on the other hand increase the latter if he deems that the oxygen margins require it. It is not necessary to design a steep descent profile through the presence of relief limiting the descent and then resulting from a level.

The flight management system offers a number of new advantages. Notably, it makes it possible to display time markers positioned in relative time indicating the oxygen available to the crew and/or the passengers according to a programmed descent profile.

Furthermore, the flight management system makes it possible to define a sequence for definition or modification of a portion of a flight plan, corresponding to a depressurization descent profile. Notably, it is possible to indicate:
  the lateral offset, the parameter of which is a capture angle;
  the level of the immediate descent level, called intermediate;
  the duration for which the intermediate level is maintained, defined by altitude constraints on the points between NRP and EOZ;
  a time condition before descending to the last level from a level;
  markers of predicted times of passage on the depressurization descent profile according to the remaining oxygen reserve.

Furthermore, the invention makes it possible to activate the descent by levels automatically on time criteria. The flight management system is capable of converting passage time values according to the remaining oxygen level and makes it possible to establish altitude, speed, time, fuel and weather predictions.

The invention allows for interfaces between the FMS, the oxygen generator and the pressurization manager, denoted CPCS.

Figure 4:
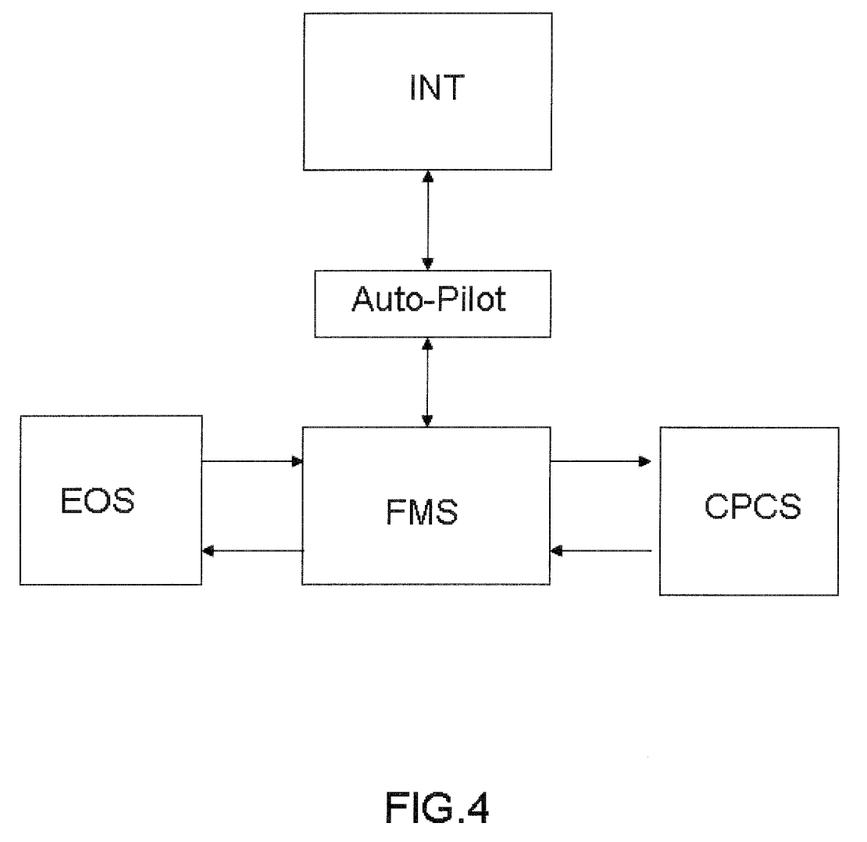
FIG. 4: an example of interfaces between the various equipment items on board involved in a depressurization case.

FIG. 4 represents the interfaces:
  between the pilot interface denoted INT and the autopilot;
  between the autopilot and the FMS;
  between the oxygen reserve, denoted EOS, and the FMS;
  between the pressure control system, denoted CPCS, and the FMS.

The acronym EOS stands for "extended oxygen system".

The acronym CPCS stands for "cabin pressure control system".

An emergency descent procedure, following the detection of a pressure variation, can make it possible to offer the crew an interface for managing the descent profile to be adopted.

The sequencing of the descent and the succession of the levels can advantageously be represented by means of a viewing device.

The time markers associated with the use of the oxygen are used for information purposes but are not taken into account by the FMS to take the descent to the next level.

The depressurization descent procedure in the presence of areas with high reliefs is not necessarily relevant when the aircraft is not flying over a mountainous area; the operator may be interested in bounding the area of activation of the procedure with a point NRP and a point EOZ.

Outside of the portion of the flight plan delimited by the points NRP and EOZ, the depressurization descent profile with a number of levels is no longer necessary and an appropriate procedure can be undertaken in the event of failure. For example, once the mountainous area is passed, this optional portion is no longer of operational interest, but the intervention can even so be used to evaluate a depressurization profile.

Advantageously, the invention makes it possible to simply generate a depressurization descent profile when flying over an area with risks, such as an area comprising a topology of high relief, while monitoring the oxygen reserve indicators thereof.

Advantageously, the invention makes it possible to configure a certain number of levels taking into account the topology of the terrain while adjusting the durations of the levels automatically according to the desired point of arrival at the last level. The latter allows for the crew and passengers to breathe freely.

Advantageously, the generation of the descent profile can be carried out automatically on activation, with an intermediate level altitude and a constraint of time of arrival at this last level as the only parameters.

Advantageously, the generation of the descent profile can be configured manually from a management interface or from a file in which the parameters have been precompleted.

The invention claimed is:

1. Method of generating a flight plan portion that is secured in case of depressurization corresponding to a depressurization descent profile in the presence of obstacles, an original flight plan being defined, wherein it comprises:
  a step of defining a first point of the flight plan, called non-return point, denoted NRP, and a second point of the flight plan, called EOZ, the two points delimiting a portion of the flight plan plotted above an area identified as "with risks";

a step of determining a first flight plan portion comprising the definition of a lateral offset angle from the original flight plan and the definition of a distance to be travelled on said offset branch, the initial point of the first portion necessarily being situated between the non-return point NRP and the second point EOZ;

a step of determining a vertical descent profile comprising the vertical part of the first flight plan portion and the vertical part of a second flight plan portion, a set of safety altitudes defining a set of levels and of waypoints for the aircraft on the two flight plan portions, the last level allowing the crew and the passengers to breathe freely without the need for additional oxygen.

2. Method of generating a secure flight plan portion in the event of depressurization corresponding to a depressurization descent profile according to claim 1, wherein it comprises:

a step of defining two radials in the horizontal plane respectively passing through the first NRP and the second EOZ points and each forming a determined angle with the route formed by the flight plan, the area situated between the two radials forming an area of obstacles in which a depressurization descent profile is adopted from means of activation by the crew of the aircraft when the aircraft is in this area.

3. Method of generating a secure flight plan portion in the event of depressurization corresponding to a depressurization descent profile according to claim 1, wherein the step of determining a descent profile comprises the definition of a first intermediate level and a last level making it possible for the crew and the passengers to breathe freely without the need for additional oxygen.

4. Method of generating a secure flight plan portion in the event of depressurization corresponding to a depressurization descent profile according to claim 3, wherein the step of determining a descent profile comprises the definition:

of a first duration corresponding to the period between the start of the offset of the aircraft and the start of the descent to the last level;

of an altitude of an intermediate level, the aircraft performing, during the first duration, a descent to the intermediate level and a flight at said altitude.

5. Method of generating a secure flight plan portion in the event of depressurization corresponding to a depressurization descent profile according to claim 4, wherein the lateral part of the second flight plan portion is generated from copying the lateral part of the original flight plan, the aircraft flying the second portion on completion of the first portion.

6. Method of generating a secure flight plan portion in the event of depressurization corresponding to a depressurization descent profile according to claim 5, wherein a depressurization descent profile is preconfigured, the lateral offset start point being the point NRP.

7. Method of generating a secure flight plan portion in the event of depressurization corresponding to a depressurization descent profile according to claim 6, wherein a preconfigured depressurization descent profile can be modified by the crew of the aircraft.

8. Method of generating a secure flight plan portion in the event of depressurization corresponding to a depressurization descent profile according to claim 5, wherein a step of verifying the presence of the aircraft between the two radials defining the area makes it possible to preactivate and activate the depressurization descent.

9. Method of generating a secure flight plan portion in the event of depressurization corresponding to a depressurization descent profile according to claim 8, wherein the step of determining a descent profile comprises the definition:

of a first time marker corresponding to a first predicted position of the aircraft on the descent profile, the first position corresponding to the stopping of the provision of oxygen for the passengers;

of a second time marker corresponding to a second predicted position of the aircraft on the descent profile, the second position corresponding to the stopping of provision of oxygen for the crew.

10. Method of generating a secure flight plan portion in the event of depressurization corresponding to a depressurization descent profile according to claim 9, wherein a step of displaying the first and the second markers from viewing means comprises the display of the markers on the portion of the flight plan corresponding to a depressurization descent profile and the display of the predictions of the altitudes and of the times of passage at said points.

11. Method of generating a secure flight plan portion in the event of depressurization corresponding to a depressurization descent profile according to claim 10, wherein the last level is situated at an altitude of 10 000 feet.

12. Method of generating a secure flight plan portion in the event of depressurization corresponding to a depressurization descent profile according to claim 9, wherein the time needed to travel the distance already travelled from the point NRP to the pressurization failure point is automatically deducted from the initial duration needed to travel the intermediate level.

13. Method of generating a secure flight plan portion in the event of depressurization corresponding to a depressurization descent profile according to claim 12, wherein the automatic pilot pilots the aeroplane controls automatically when the activation by the crew of the depressurization descent profile is engaged.

14. Device for securing a flight for aircraft, said device comprising:

a. a flight computer capable of generating a depressurization descent profile;

b. an interface for managing the parameters of the depressurization descent profile;

c. wherein the flight computer is adapted to perform the method of generating a flight plan portion that is secured in case of depressurization corresponding to a depressurization descent profile in the presence of obstacles, an original flight plan being defined, wherein it comprises:

1. a step of defining a first point of the flight plan, called non-return point, denoted NRP, and a second point of the flight plan, called EOZ, the two points delimiting a portion of the flight plan plotted above an area identified as "with risks";

2. a step of determining a first flight plan portion comprising the definition of a lateral offset angle from the original flight plan and the definition of a distance to be travelled on said offset branch, the initial point of the first portion necessarily being situated between the non-return point NRP and the second point EOZ;

3. a step of determining a vertical descent profile comprising the vertical part of the first flight plan portion and the vertical part of a second flight plan portion, a set of safety altitudes defining a set of levels and of waypoints for the aircraft on the two flight plan portions, the last level allowing the crew and the passengers to breathe freely without the need for additional oxygen; and d. the interface for managing the parameters of the depressurization descent profile can be used to configure:
1. a first duration corresponding to the time elapsed between the moment of lateral offset and the moment of the start of the descent to the last level;
2. the lateral offset angle from the original flight plan;
3. a distance to be travelled on said offset branch;
4. the altitude of the intermediate level, corresponding to a minimum altitude above the relief; and
5. the points NRP and EOZ.

15. Device for securing a flight for aircraft according to claim 14, wherein the interface for managing the parameters of the depressurization descent profile can be used to configure lateral inclination angles of the radials passing through each of said points.

16. Device for securing a flight for aircraft according to claim 14, wherein the interface for managing the parameters of the depressurization descent profile can be used to manually or automatically configure a descent profile comprising a number of descent segments before reaching a last level, the profile comprising, by means of the flight computer, the calculation of:
the flight duration of the first portion, the vertical profile during the first portion, and the position of the point of arrival at the intermediate altitude;
the flight duration of the intermediate level and the position of the start point of the descent to the last level;
the vertical profile and the flight duration of the descent to a last level of altitude corresponding to the reference altitude at which the aircraft is stabilized on completion of the depressurization descent procedure;
the position of the first waypoint at the last level.

17. Device for securing a flight for aircraft according to claim 14, said device comprising:
a pressurization manager comprising means of detecting the loss of pressure in the cockpit;
an oxygen generator comprising interfaces with the FMS;
an interface for managing the parameters of the depressurization descent profile;
means of displaying the flight plan and the aircraft;
wherein the viewing means display:
the original flight plan;
the flight plan comprising the lateral offset and the vertical descent profile comprising the two generated portions and;
two markers on said portions indicating at which instants the oxygen reserves for the passengers and for the crew will be exhausted.

* * * * *